2,967,124

O,O-DI LOWER ALKYL PHOSPHORODITHIOATE DERIVATIVES OF DIALLYL MALEATE

Sidney B. Richter, Chicago, Ill., assignor to Velsicol Chemical Corporation, Chicago, Ill., a corporation of Illinois No Drawing. Filed Mar. 16, 1959, Ser. No. 799,463

5 Claims. (Cl. 167—22)

This invention relates to new chemical compositions of matter. More specifically, this invention relates to the new chemical compounds of the formula

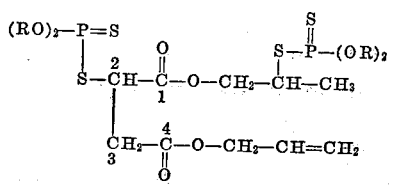

wherein R is either the methyl or the ethyl radical. These new compounds are useful as pesticides, particularly as insecticides and miticides.

The compounds of this invention are the addition products of one mole of diallyl maleate with two moles of either O,O-dimethyl phosphorodithioate or O,O-diethyl phosphorodithioate. The addition reaction can be carried out with at least these molecular proportions of reactants, but it is desirable to use an excess of the dialkyl phosphorodithioate. Although the reaction can be carried out satisfactorily in the absence of a solvent, an inert solvent or diluent such as an aromatic hydrocarbon can be used. It is desirable to add a trace of an oxidation inhibitor such as hydroquinone to the reaction mixture. The temperature at which the reaction is carried out is not critical, but temperatures in the range from about normal room temperature to about 70° C. are preferred. The reaction mixture is cooled and taken up in a solvent such as an aromatic hydrocarbon, provided a solvent has not already been used to run the reaction. The solution is washed first with a dilute aqueous solution of a base such as sodium carbonate and then with water to remove any excess of the dialkyl phosphorodithioate. The solution is dried over a suitable drying agent, and the solvent is distilled off in vacuo. While the product obtained in this manner is often suitable for pesticidal use without further treatment, it can be purified by fractional distillation or other techniques known to those skilled in the art.

The manner in which the new chemical compounds of this invention can be prepared is illustrated in the following example.

EXAMPLE 1

*Preparation of the 2:1 addition product of O,O-dimethyl phosphorodithioate and diallyl maleate*

Diallyl maleate (39.2 g.; 0.2 mole) and a trace of hydroquinone were placed in a 250-ml., round-bottomed flask fitted with a mechanical stirrer, reflux condenser, and internal thermometer. O,O-dimethyl phosphorodithioate (112 g.; 0.7 mole) was added slowly in portions. The reaction was slightly exothermic, and the mixture was allowed to cool or was cooled with cold water before each addition. The mixture was allowed to stand at room temperature overnight, after which it was heated to 65° C. and stirred at this temperature for a total of 30 hours. The cooled reaction mixture was then dissolved in benzene and washed first with 200 ml. of 10% sodium carbonate solution and then with water. The slightly cloudy benzene solution was dried over anhydrous calcium chloride and filtered through Super-Cel filtering aid to give a clear solution. The benzene was distilled off in vacuo, the last traces of benzene being removed with a mechanical vacuum pump. The cloudy residue was filtered with suction through "Super-Cell" diatomaceous silica filtering aid to give 91 g. of 1-($\beta$-O,O-dimethylphosphorodithio)propyl 4-allyl 2-(O,O-dimethylphosphorodithio)succinate, an oil having an index of refraction (D line) at 21° C. of 1.5277.

Analysis for $C_{14}H_{26}O_8P_2S_4$.—Theory: P, 12.10%; S, 25.04%. Found: P, 12.42%; S, 25.22%.

The corresponding 1-($\beta$-O,O-diethylphosphorodithio)propyl 4-allyl 2-(O,O-diethylphosphorodithio)succinate, the 2:1 addition product of O,O-diethylphosphorodithioate and diallyl maleate, can be prepared by reacting said components in a manner similar to that described in the above example.

To avoid ambiguity, the Chemical Abstracts numbering system for succinic acid,

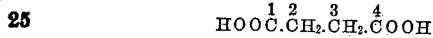

has been used in naming the compounds of this invention. It is obvious that the isomers which can form in the addition reaction, such as the 4-($\beta$-substituted)propyl 1-allyl 2-substituted-succinates, are also within the scope of this invention.

The utility of the compounds of this invention was illustrated, for example, by experiments carried out for control of the pea aphid (*Macrosiphum pisi*) by contact. The test compounds were formulated as wettable powder concentrates by adding to an inert carrier and grinding to a uniform blend on a ball mill. The respective formulations were then diluted in water to the desired concentrations of actual chemical. Wingless adult pea aphids, confined in spherical wire mesh cages, were sprayed for 5 seconds at 20 pounds' pressure with appropriate concentrations of the formulations. The treated aphids were transferred to and caged on untreated broad bean plants, maintained under greenhouse conditions for 72 hours, and then observed for percentage mortality. Three replicates were used for each level of application. In these experiments, the product of Example 1, used at a concentration of 0.2% gave 100% mortality of the aphids, while there was no mortality in an untreated control. This same compound also controlled the pea aphid effectively when applied systemically.

Experiments were also carried out for control of the Mexican bean beetle (*Epilachna varivestis*) by stomach poisoning. Test compounds were formulated and diluted as in the pea aphid experiments described above. Cranberry bean plants were then dipped in appropriate concentrations of the various formulations and allowed to dry. Third instar larvae of the beetles were then caged on the treated plants and maintained under greenhouse conditions for 48 hours, after which time observations of mortality, plant injury, and percent feeding were made. Three replicates were used for each level of application. In these experiments, the product of Example 1 used at a concentration of 0.2% gave complete mortality of the beetles with no plant injury, while there was no mortality in an untreated control.

Experiments were also carried out for the systemic control of the two-spotted spider mite (*Tetranychus bimaculatus*) by root absorption and translocation. The test compounds were dissolved in acetone and dispersed in distilled water at the desired concentrations of actual chemical. Host plants, infested with mixed life stages of the mites, were uprooted, washed free of soil, and placed in glass jars containing 100 cc. of the dispersed test compound. Aluminum foil was placed around the plant stem and jar to reduce possible escape of toxic vapors from the test dispersion. The test plants were maintained in this manner in the greenhouse for 7 days and then observed for systemic miticidal effectiveness. Three replicates were used for each treatment. In these experiments, the product of Example 1 used at a concentration of 50 p.p.m. gave 100% mortality of the mites with no plant injury, while there was no mortality in an untreated control. This compound was also toxic to the mites by contact.

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogeneous, free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylenepolyol fatty acid esters, polyol fatty acid monoesters, lecithin, di- and higher polyhydric alcohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 2

Preparation of an emulsifiable concentrate

The following ingredients are blended thoroughly until a homogeneous liquid concentrate is obtained. This concentrate is mixed with water to give an aqueous dispersion containing the desired concentration of active compound for use as a spray.

| | |
|---|---|
| 1 - ($\beta$ - O,O - dimethylphosphorodithio)propyl 4 - allyl 2-(O,O-dimethylphosphorodithio)succinate | 25 |
| Sodium lauryl sulfate | 2 |
| Sodium lignin sulfonate | 3 |
| Kerosene | 70 |

EXAMPLE 3

Preparation of a wettable powder

The following components were mixed intimately in conventional mixing or blending equipment and are then ground to a powder having an average particle size of less than about 50 microns. The finished powder is dispersed in water to give the desired concentration of active compound.

| | |
|---|---|
| 1 - ($\beta$ - O,O - dimethylphosphorodithio)propyl 4 - allyl 2 - (O,O-dimethylphosphorodithio)succinate | 75 |
| Fuller's earth | 22.75 |
| Sodium lauryl sulfate | 2.00 |
| Methyl cellulose | .25 |

EXAMPLE 4

Preparation of an oil-dispersible powder

The following components are blended and ground as described in the previous example to give a powder which can be dispersed in oil to form a spray containing the desired concentration of active compound.

| | |
|---|---|
| 1-($\beta$-O,O-dimethylphosphorodithio)propyl 4-allyl 2-(O,O-dimethylphosphorodithio)succinate | 70 |
| Condensation product of diamylphenol with ethylene oxide | 4 |
| Fuller's earth | 26 |

EXAMPLE 5

Preparation of a dust

The following ingredients are mixed thoroughly and then ground to an average particle size of less than about 50 microns to give a dust suitable for application with conventional dusting equipment.

| | |
|---|---|
| 1-($\beta$-O,O-diethylphosphorodithio)propyl 4-allyl 2-(O,O-diethylphosphorodithio)succinate | 20 |
| Talc | 80 |

EXAMPLE 6

Preparation of a granular formulation

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

| | |
|---|---|
| 1-($\beta$-O,O-diethylphosphorodithio)propyl 4 - allyl 2-(O,O-diethylphosphorodithio)succinate | 10 |
| Fuller's earth | 66 |
| Dextrin | 20 |
| Sodium lignin sulfonate | 3 |
| Kerosene | 1 |

I claim:
1. A compound of the formula

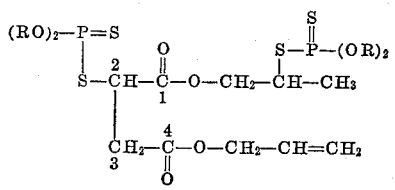

wherein R is selected from the group consisting of the radicals —CH$_3$ and —CH$_2$CH$_3$.

2. 1-(β-O,O-dimethylphosphorodithio)propyl 4-allyl 2-(O,O-dimethylphosphorodithio)succinate.

3. 1-(β-O,O-diethylphosphorodithio)propyl 4-allyl 2-(O,O-diethylphosphorodithio)succinate.

4. An insecticidal and miticidal composition comprising an inert carrier and a toxic amount of a compound of claim 1.

5. A method of destroying undesirable insects and mites which comprises contacting these pests with an insecticidal and miticidal composition comprising an inert carrier and as the essential active ingredient, in a quantity which is injurious to these pests, a compound of claim 1.

No references cited.